(12) United States Patent
Rastegar et al.

(10) Patent No.: US 7,419,326 B2
(45) Date of Patent: Sep. 2, 2008

(54) METHOD FOR ACCELERATING A PASSENGERED VEHICLE UPON A ROADWAY

(75) Inventors: Jahangir S. Rastegar, Stony Brook, NY (US); Qiaode Jeffrey Ge, East Setauket, NY (US)

(73) Assignee: Omnitek Partners LLC, Bayshore, NY (US)

( * ) Notice: Subject to any disclaimer, the term of this patent is extended or adjusted under 35 U.S.C. 154(b) by 0 days.

(21) Appl. No.: 11/247,799

(22) Filed: Oct. 11, 2005

(65) Prior Publication Data

US 2006/0029468 A1 Feb. 9, 2006

Related U.S. Application Data (62) Division of application No. 10/372,496, filed on Feb. 24, 2003, now Pat. No. 6,969,213.

(51) Int. Cl.
*E01C 9/00* (2006.01)

(52) U.S. Cl. .............. 404/71; 404/72; 244/63; 244/114 R (58) Field of Classification Search ............ 404/6, 404/9, 10, 11, 15, 17, 71, 72; 290/1 R; 244/50, 244/63, 114 R
See application file for complete search history.

(56) References Cited

U.S. PATENT DOCUMENTS

| | | | | |
|---|---|---|---|---|
| 1,027,242 A | * | 5/1912 | Curtiss | 244/63 |
| 1,523,244 A | * | 1/1925 | Bain | 104/79 |
| 1,715,891 A | * | 6/1929 | Beck | 104/79 |
| 1,916,873 A | | 7/1933 | Wiggins | |
| 2,917,283 A | * | 12/1959 | Sumners | 256/1 |
| 3,359,920 A | * | 12/1967 | Iammatteo | 463/62 |
| 3,392,937 A | * | 7/1968 | Riblett, Jr. | 244/63 |
| 3,548,534 A | * | 12/1970 | Ryan et al. | 446/430 |
| 3,726,498 A | * | 4/1973 | Schlegel | 244/110 C |
| 3,885,163 A | | 5/1975 | Toberman | |
| 3,889,543 A | * | 6/1975 | Mast | 74/88 |
| 3,971,454 A | * | 7/1976 | Waterbury | 180/65.8 |
| 4,090,621 A | * | 5/1978 | Parent | 414/230 |
| 4,173,431 A | * | 11/1979 | Smith | 417/229 |
| 4,185,409 A | * | 1/1980 | Cheng | 446/487 |
| 4,238,687 A | | 12/1980 | Martinez | |
| 4,239,975 A | | 12/1980 | Chiappetti | |
| 4,247,785 A | | 1/1981 | Apgar | |
| 4,250,395 A | | 2/1981 | Lundgren | |
| 4,434,374 A | | 2/1984 | Lundgren | |
| 4,437,015 A | | 3/1984 | Rosenblum | |
| 4,614,875 A | | 9/1986 | McGee | |
| 4,739,179 A | | 4/1988 | Stites | |
| 4,889,513 A | * | 12/1989 | Paddock | 446/197 |
| 4,980,572 A | | 12/1990 | Sen | |
| 5,317,976 A | * | 6/1994 | Aruga et al. | 104/282 |
| 5,355,674 A | | 10/1994 | Rosenberg | |
| 5,452,893 A | * | 9/1995 | Faulk et al. | 463/68 |
| 5,634,774 A | * | 6/1997 | Angel et al. | 417/229 |
| 6,172,426 B1 | | 1/2001 | Galich | |

(Continued)

*Primary Examiner*—Gary S Hartmann (57) ABSTRACT

A roadway upon which a wheeled vehicle travels is provided. The roadway including a movable surface extending in a direction of the vehicle's travel and a potential energy transfer arrangement operatively connected to the movable surface for transferring a stored potential energy associated with the movable surface into kinetic energy upon movement of the movable surface thereby propelling the vehicle. A method for accelerating a vehicle upon a roadway is also provided.

1 Claim, 8 Drawing Sheets

U.S. PATENT DOCUMENTS

| | | |
|---|---|---|
| 6,204,568 B1 | 3/2001 | Runner |
| 6,353,270 B1 | 3/2002 | Sen |
| 6,362,534 B1 | 3/2002 | Kaufman |
| 6,494,144 B1 | 12/2002 | Perez Sanchez |
| 6,734,575 B2 * | 5/2004 | Ricketts ............ 290/1 R |
| 6,949,840 B2 * | 9/2005 | Ricketts ............ 290/1 R |
| 7,067,932 B1 * | 6/2006 | Ghassemi ........... 290/1 R |
| 2003/0034652 A1 * | 2/2003 | Slatkin ............. 290/1 R |
| 2004/0066041 A1 * | 4/2004 | Hunter, Jr. ......... 290/1 R |
| 2004/0165949 A1 * | 8/2004 | Rittenhouse et al. ... 404/6 |

* cited by examiner

METHOD FOR ACCELERATING A PASSENGERED VEHICLE UPON A ROADWAY

CROSS-REFERENCE TO RELATED APPLICATION

This application is a divisional application of U.S. application Ser. No. 10/372,496 filed on Feb. 24, 2003 now U.S. Pat. No. 6,969,213, the contents of which is incorporated herein by its reference.

BACKGROUND OF THE INVENTION

1. Field of the Invention

The present invention relates generally to moving objects and devices for use therewith, and more particularly, to methods and devices for accelerating and decelerating moving vehicles.

2. Prior Art

Along many highways, exits are provided for runaway trucks or other types of vehicles. Once a vehicle takes such an exit, it enters a stretch of a road that is filled with relatively fine sand of an appropriate depth. As the runaway vehicle enters the sand-filled portion of the road, it quickly begins to decelerate and slow down and after a relatively short distance it comes to rest. The deceleration of the vehicle is caused primarily by the process of "sinking" the vehicle tires into the sand, and forcing it to continuously "climb the height of the sand in front of it, i.e., a height equal to the sinking depth of the tire. The kinetic energy of the vehicle is absorbed primarily by the friction forces generated within the displacing sand. This process is fairly similar to an uphill travel of a vehicle, which would decelerate a non-powered vehicle and eventually bring it to rest. The amount of deceleration, i.e., the rate of slow-down, is dependent on the uphill slope. For the case of a sand-filled road, the amount of deceleration that can be achieved is dependent on the depth of the sand and the mechanical characteristics in terms of the amount of resistance that it can provide to its displacement by the tires.

As the vehicle travels along the sand-filled road, the vehicle usually experiences a fairly bumpy ride, since the sand cannot be made and maintained perfectly flat and perfectly homogeneous or protected from contaminants carried by the wind and rain and also by an uneven absorption of moisture. Another major disadvantage of the sand is that due to the relatively small friction that it provides between the tire and the roadway, the tires can easily skid sideways and slip, particularly if the driver attempts to use the brakes, and the vehicle may easily be rendered minimally controllable while slowing down. As a result, accidents, such as overturning and jack-knifing, can occur while the vehicle is being brought to rest. The skidding, slipping and partial loss of control becomes increasingly more probable with increased initial speed of the vehicle as it enters the stretch of sand-filled road.

In addition, a depth of sand that is most appropriate for a certain vehicle weight, number of tires, and/or tire size may not be appropriate for other vehicles having a significantly different weight, number of tires, and/or tire size. For example, a road with a depth of sand that is appropriate for a heavy truck will decelerate a light vehicle too fast and can therefore result in injury to the passengers due to the rapid deceleration and/or most likely due to the vehicle loss of control. The optimal depth of the sand is also dependent on the initial speed of the vehicle. If a vehicle enters the sand-filled road with a relatively slow speed, then it would be best for the depth of sand to be relatively small, so that the vehicle is brought to stop as slowly as the length of the sand-filled road allows. Other factors also contribute to the optimal design of such sand-filled roads such as the weight of the vehicle, the number and size of the tires, etc. In short, to achieve an optimal condition, a sand-filled road has to be tuned to the type of the vehicle, its entering weight and initial velocity. In addition, the road and sand conditions have to be regularly monitored and maintained. Such conditions cannot obviously be met for roads that are constructed for general use and are subject to various environmental conditions. Such sand-filled roads are in use in numerous highways and are particularly located where the downward slope of the road is high and heavier vehicles such as trucks are prone to run away and are used as the means of last resort.

Such sand-filled roads are not, however, suitable for fast moving vehicles such as airplanes. For the case of airplanes, other issues may also arise. For example, the load on each tire is usually much larger than road vehicles; the relative distance between the tires may be smaller than those of road vehicles, thereby rendering them more uncontrollable; the center of mass of the plane may be higher than that of road vehicles, thereby making them more prone to tipping over; etc. In addition, and particularly for fast moving planes, the load applied to the tires keep varying due to the suspensions and the lift action, and therefore may cause a ripple to be formed on the surface of the sand-filled road, thereby making the ride even more bumpy and uncontrollable. In addition, the sand-filled section of the runway needs to be re-leveled after each use. In short, sand-filled roads are not appropriate and practical for fast moving vehicles in general and for airplanes in particular.

To overcome the aforementioned shortcomings for airplanes, runway segments have been added to the end of test runways that are constructed with a special type of concrete that collapses in a more or less controlled manner under the load of the airplane tire. Such runway segments solve some of the aforementioned problems of sand-filled roadways. However, such runway segments leave some of the major aforementioned problems unsolved and they even create some new problems and hazards. For example, the problem of lack of control is only partially solved by reducing the skidding potential caused by the sand. However, the collapsed concrete tends to constrain the tire to travel, more or less, in the generated "groove," making it difficult for the plane to maneuver (turn) sideways due to the resistance that the uncrushed "concrete wall" provides against the tire as it attempts to turn sideways. In addition, the concrete material cannot be formed such that it is sufficiently homogeneous to prevent bumpy rides. In addition, the collapsible concrete runway can only be optimally formulated and constructed for a certain airplane with a certain total weight and certain initial velocity as it reaches the collapsible segment of the runway.

Furthermore, once the collapsible segment of the runway is used by a "runaway" plane during landing or takeoff, the damaged segment has to be repaired before the runway can be opened to traffic. Otherwise, the damaged segment would pose a hazardous condition for the next runaway plane or even for a plane that could have stopped if a regular runway segment was present in place of the collapsible segment. In addition, while the repair crew is repairing the damage, any takeoff or landing would pose a hazardous condition for the repair crew and the plane. The use of the runway must therefore wait for the completion of the repairs, including the time required for the proper setting of the added or replaced sections of the concrete and inspection of the final condition of the runway. In short, the operation of the airport must be significantly curtailed for a significant length of time, and if the airport has only one runway, the entire operation of the airport has to be suspended until the damaged sections of the collapsible runway has been repaired. In short, such collapsible runway segments have major technical difficulties for safe operation and even those technical problems are one day solved, they are still effectively impractical due to the required relatively long periods of closure after each use and the related economical costs involved.

A need therefore exits for reusable runways and driveways that can slow down or bring to stop a "runaway" vehicle. For high-speed approaches, particularly for airplanes, it is also essential that the ride be as smooth as possible and that the vehicle stays fully controllable during the entire time it is being decelerated. It is also highly desirable that the runway or driveway parameters be readily adjustable to optimally match the type, weight and initial speed of the vehicle. Such adaptable runway segments are particularly important for planes for the aforementioned reasons and in practice, the parameters of the runway segment can be readily adjusted by the air traffic controller or even by the pilot since all the required information about the plane and its flight conditions is known prior to landing and takeoff. The information may even be automatically transmitted from the plane by a wireless means to a central processor. In addition, if the plane is experiencing some type of malfunction or is damaged, the runway segment may be adjusted for optimal performance with each specific condition. Such changes in the runway parameters may be achieved manually or automatically before the plane reaches the runway segment or even as it is traveling along the runway.

Such runway segments may even be placed along the entire length or a portion of the runway (or other road surface) to routinely assist in the deceleration of aircraft (or other vehicles), thereby reducing their tire and brake wear. The equipped runway segments may also be kept inactive, thereby acting as a regular (solid) segment of the roadway surface, and be activated only when needed, such as in an emergency.

SUMMARY OF THE INVENTION

Hereinafter, such runway or driveway segments are referred to as "reusable and adaptive runways" (RAR) without intending to limit their applications to airplanes or for their deceleration. Those skilled in the art will appreciate that the devices and methods of the present invention, although having particular utility for decelerating aircraft, can be used for any type of vehicle and for deceleration as well as acceleration thereof. For example, the RAR can be used on portions of a highway, such as on segments of the shoulders of the roadway for emergency stops or on exit ramps to assist in decelerating vehicles, particularly those that are traveling at dangerously high speeds, as they leave the highway. Thus, the RAR can be used regularly in such situations to decrease the length of exit ramps, or can be used in connection with a detection system and only employed where a dangerous condition is detected. In the latter, for example, a detection system can detect a large truck traveling too fast for a particular exit ramp and as a result automatically activate the RAR to slow the truck. Of course, a manual operator can also activate the RAR, which can be the driver of the truck.

During landing, the kinetic energy of the airplane due to its mass and speed is transformed into potential energy stored in elastic or other similar types of elements of the RAR. A portion of the kinetic energy, preferably a small portion, is transformed into other types of energies such as heat. The stored potential energy may later be used to accelerate the airplane forward during takeoff, thereby reducing the amount of energy required to bring the plane to its takeoff speed, and/or shorten the length of the runway needed for takeoff.

The primary objective of the present invention is to provide reusable and adaptive runways (RAR) that can be used safely by high-speed vehicles in general and airplanes in particular. To this end, the disclosed RAR has one or more of the following characteristics:

1. The RAR is preferably reusable, in the sense that none of its components are permanently damaged after each use and can be brought back to its usable condition within a very short period of time automatically or by an operator.

2. An operator is preferably able to set and control the parameters of the runway to optimally match the type, weight, initial speed and other appropriate traveling conditions of the vehicle as possible.

3. As the vehicle travels along the RAR and its characteristics and traveling conditions are measured more accurately or is varied, the parameters of the RAR can be preferably adjusted accordingly for more optimal operation of the RAR. For example, if the vehicle brakes are still operational, then the RAR could be set to only assist the brakes in stopping or slowing down the vehicle.

4. The runway may preferably be equipped with any one of the available means of determining the entering speed of the vehicle, its weight and by means of a pattern recognition software, the type of vehicle and any visible structural damage for optimally setting the parameters of the RAR automatically or by an operator (which may be the driver or the pilot).

5. The runway may be equipped with the communications equipment necessary to receive the information indicated in the previous item directly from the vehicle for use for optimally setting the parameters of the RAR automatically or by an operator (which may be the driver or the pilot). The RAR controller may combine the information received from the vehicle with information collected by the runway sensory instrumentation (as described in the previous item) to check for any discrepancy or added information and base its decision for optimal setting of the RAR parameters on the total collected data for maximum reliability.

6. The RAR provides a safe process for slowing down the vehicle or for bringing it to a stop in the sense that it does not reduce the friction between the tire and the runway surface and it does not tend to force the tire to follow a given path such as the impressed path generated in the collapsible concrete or sand, both of which can readily lead to skidding, slippage and/or loss of control by the pilot or driver.

7. The operator of the vehicle or the runway or an appropriately computerized automated control unit is preferably able to optimally set the parameters of the RAR for bringing the vehicle to a complete stop or to a reduced speed over a desired distance of travel along the RAR.

8. The RAR system can be set to operate automatically, i.e., become operational for each and every landing and takeoff, thereby providing a failsafe mechanism for the operation of runways.

9. The entire or a major segment of the runway may be constructed as a RAR unit, thereby allowing planes to use them to bring them to a stop with minimal or less use of their brakes, thereby minimizing braking system, tire, and runway wear.

Another objective of the present invention is to provide the means to reduce the required length of runways for landing airplanes, while reducing stress on the structure of the airplane during hard braking, reducing tire wear, reducing brake wear, and making the airplane more controllable during its deceleration. Deceleration by braking is the result of the work done by the friction force between the tire and the road surface. This friction force tends to tip over the vehicle since it acts at a point away (below) the center of mass of the vehicle. In this regard, an advantage of the RAR runways is that it can decelerate vehicles without the tendency of tipping them over.

Another objective of the present invention is to provide the means to reduce the required length of runways for airplane takeoff, while reducing the stress on the structure of the plane and saving fuel.

Another objective of the present invention is to provide RAR segments that partially disabled airplanes may use for landing with greatly increased probability of coming to stop safely rather than, e.g., sliding uncontrollably to a stop over great distances, which could mean leaving the runway and striking some obstacles or falling into a ditch or water. In addition, since the runway surface is readily accessible from under the RAR surface panels, provisions can be made to introduce highly sticky and/or fire retardant or fire distinguishing substances such as fluid or foam to the surface of the runway or spray the same some distance above the surface over the incoming vehicle to significantly reduce the probability of fire and/or introduce fire inhibiting gases so that the spilled fuel could not be ignited and/or prevent the fire from spreading.

In the remainder of this description, the basic principles of operation and various embodiments of the present invention are described in terms of airplanes and runways. However, it is understood that whenever applicable, the terms also apply to ground and other similar vehicles.

A basic principle of the operation of the reusable and adaptable runaways (RAR) of the present invention is the provision for the vehicle (tires or some other structural member of a damaged aircraft) to continuously tend to climb an inclined surface, which under the weight of the vehicle undergoes a displacement thereby deforming certain elastic elements. The process is similar to the vehicle traveling uphill, and as the vehicle travels along the runway, its kinetic energy is stored in the deformed elastic elements. However, no significant amount of potential energy stored in the elastic elements is preferably transferred back to the vehicle as it passes over the displaced surface of the RAR. To this end, appropriate means are preferably provided to "lock" the elastic elements in their deformed position, i.e., to "lock" the runway structure and its various members substantially in their deformed configuration.

Accordingly, a roadway upon which a vehicle travels is provided which assists in decelerating the vehicle. The roadway comprises: a movable surface extending in a direction of the vehicle's travel; and potential energy storage means operatively connected to the movable surface for converting a kinetic energy of the vehicle into potential energy upon movement of the movable surface thereby slowing the vehicle.

Also provided is a roadway upon which a wheeled vehicle travels which assists in accelerating the vehicle. The roadway comprises: a movable surface extending in a direction of the vehicle's travel; and potential energy transfer means operatively connected to the movable surface for transferring a stored potential energy associated with the movable surface into kinetic energy upon movement of the movable surface thereby propelling the vehicle.

Still provided is a method for slowing a vehicle upon a roadway. The method comprising: providing a movable surface upon which the vehicle travels; converting a kinetic energy of the vehicle into potential energy upon movement of the vehicle over the movable surface; and storing the potential energy in the elastic elements of the movable surface mechanism to thereby slow the vehicle.

Still provided is an RAR in which part or all of the kinetic energy transferred to the movable surface mechanism is absorbed by viscous damping and/or dry friction forces and/or by controlling electric motors and/or electric power generators.

Still yet further provided is a method for accelerating a vehicle upon a roadway. The method comprising: providing a movable surface upon which the vehicle travels; and moving the movable surface to transfer a potential energy stored in the movable surface to the vehicle to thereby propel the vehicle.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of roadways and surfaces, it has been found particularly useful in the environment of runways for aircraft. Therefore, without limiting the applicability of the invention to runways for aircraft, the invention will be described in such environment. Those skilled in the art will appreciate that the RAR of the present invention can be used on roadways for automobiles and trucks and for other wheeled vehicles. The RAR of the present invention can also be adapted for use with trains where the panels described below are proximate the rails upon which the trains travel.

Figure 1:
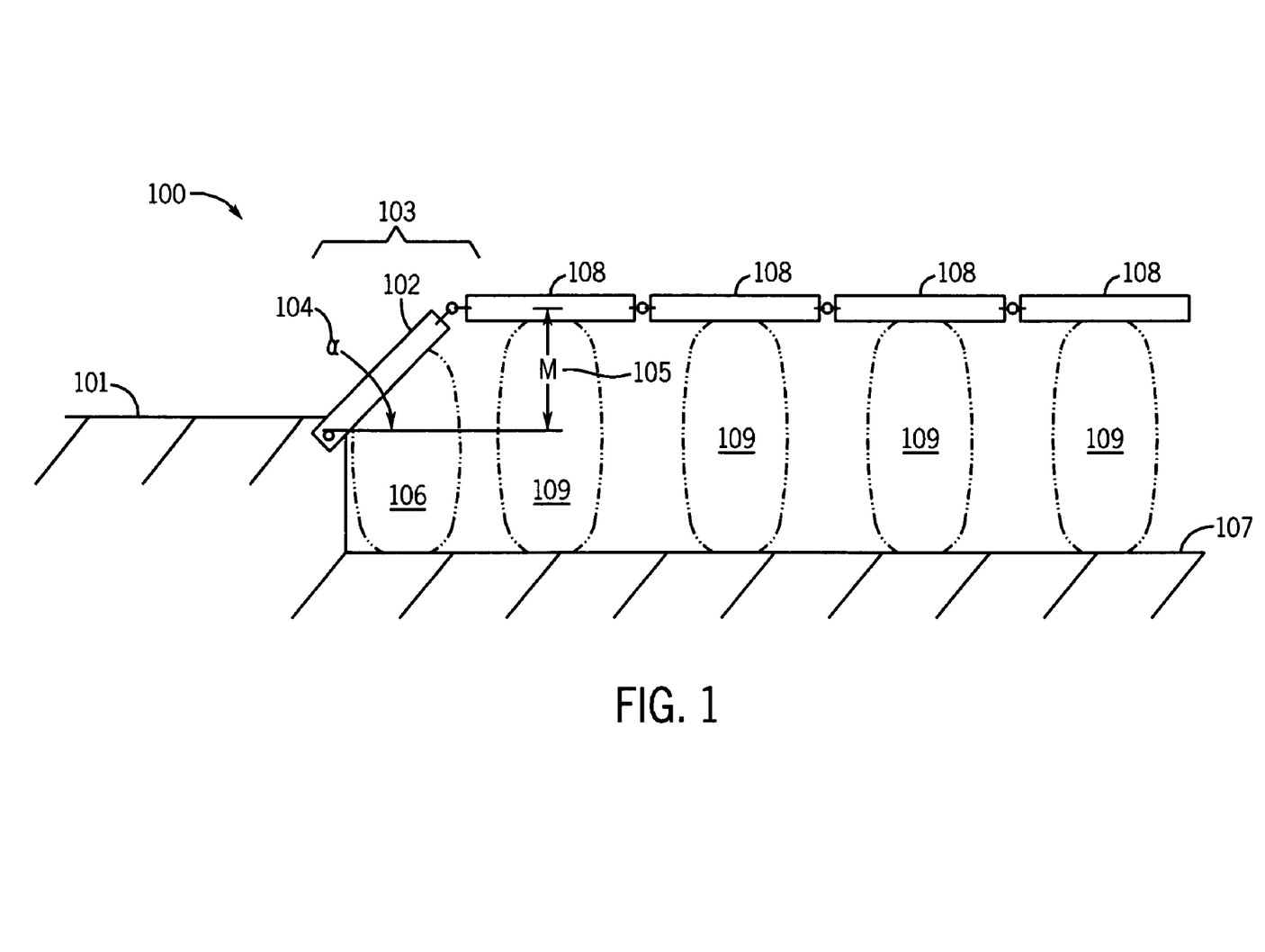
FIG. 1 illustrates a schematic sectional view of a preferred implementation of a reusable and adaptive runway of the present invention.

A schematic of the side view of a preferred RAR illustrating its basic principles of operation is shown in FIG. 1. In this illustration, the RAR 100 segment is shown positioned at the end of a typical (fixed) runway 101. At the end of the fixed runway 101, one or more transition runway panels 102 are to be installed in a transition segment 103 of the RAR 100. The function of the transition segment 103 of the RAR 100 is to provide for a smooth transition for a vehicle during its motion from the fixed segment of the runway 101 to the RAR segment 100. In general, more than one transition runway panel 102 is preferred in order to make the vehicle motion smooth as it enters the RAR segment 100 of the runway, i.e., in order to prevent the tires from suddenly striking the RAR segment 101 which would otherwise form a step like configuration immediately following the fixed runway segment 100.

The transition runway panels 102 are constructed with a surface panel 102 which make an angle α (104 in FIG. 1) with the surface of the fixed runway 101, rising to the height H (105 in FIG. 1). Under the transition runway panel(s) 102 are elastic elements, motion constraining mechanisms, braking mechanisms, and all other components, collectively shown in FIG. 1 as element 106, which hereinafter is referred to as the runway panel "support and control assembly." The details of the support and control assembly 106 is provided in FIG. 2. The support and control assembly 106 is mounted on a runway foundation 107. Following the transition runway panels 102, the regular runway panels 108 are positioned. The runway panels 108 are held in place above the foundation 107 by support and control elements 109, which are very similar in function and construction to the support and control elements 106. In FIG. 1 and to simplify the illustration, the mechanisms used to attach the transition panels 102 to the fixed runway 101 and to the other transition 102 and regular runway panels 108 are not shown. These details are provided in the ensuing illustrations. In addition, it is understood that the outermost side of the runway panels 108 are preferably not exposed. In practice, the sides of the runway panels 108 are preferably protected from the elements without the addition of any motion restraining elements such as with simple bellows. In addition, it is understood that in FIG. 1 only one runway panel 108 is shown along the width of each segment of the RAR 100. However, it is understood that more than one runway panel 108 may be positioned side by side along the width of each runway panel segment 108.

Figure 2:
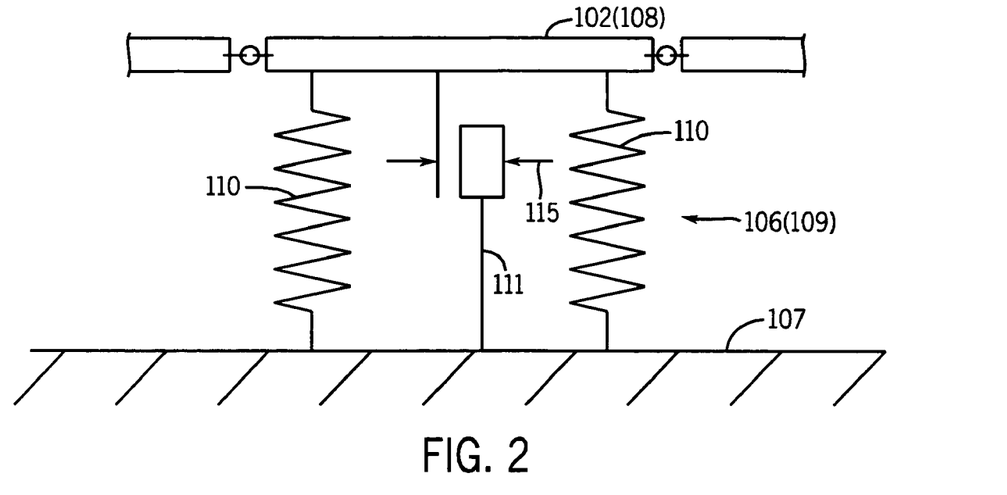
FIG. 2 illustrates a schematic of a single runway panel and support and control elements corresponding to the panel.
Figure 3:
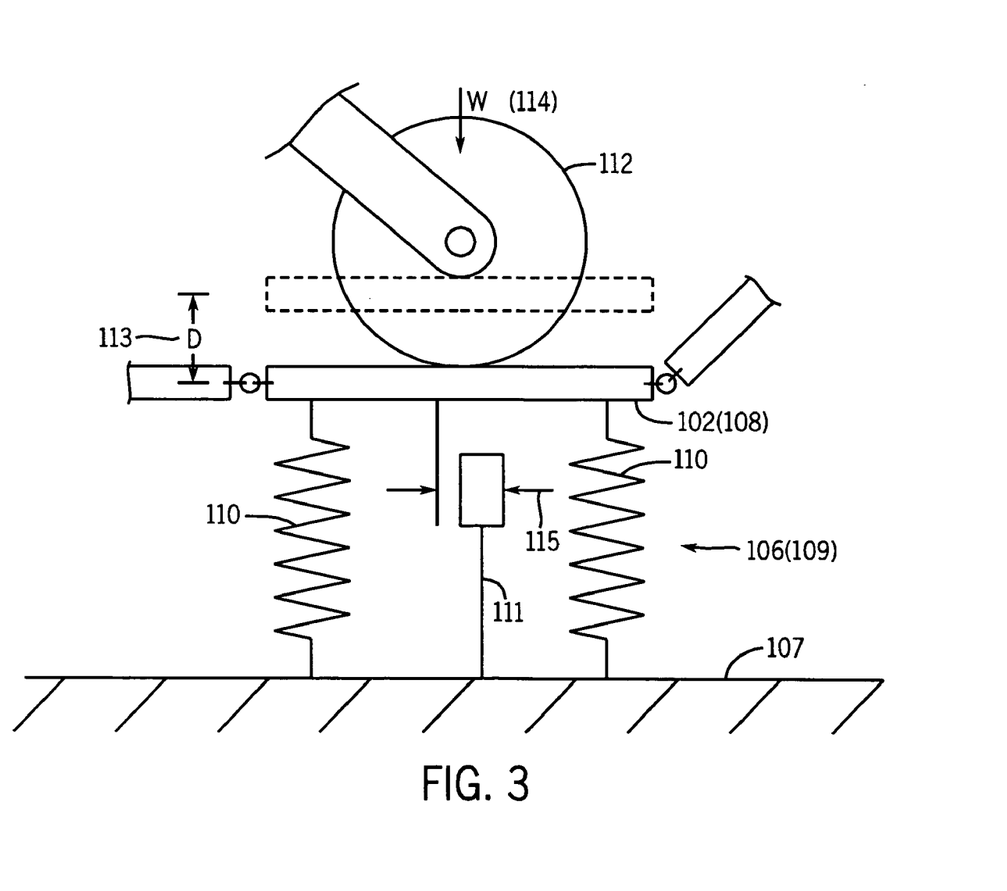
FIG. 3 illustrates a schematic of the single runway panel of FIG. 2 under the weight of a vehicle tire.

The structure of the simplest type of support and control elements 106 and 109 is shown in the schematics of FIGS. 2 and 3. Such a support and control element consists of one or more spring elements 110 and one or more braking elements 111 connecting the runway panels 102 and 108 to the runway foundation 107. As the vehicle tire 112 leaves the fixed portion of the runway 101, it first rolls over the panels 102 within the transition segment 103 of the RAR 100, and then rolls over the regular RAR panels 108 as shown in FIG. 3. The relatively small angle α (104) ensures that the transition between the transition panel 102 and regular panel 108 segments of the RAR 100 is relatively smooth. Depending on the weight W (114) being born on the tire 112 and the total spring rate provided by the spring elements 110, the panel 102 (108) is displaced downward a distance D (113) as shown in FIG. 3. The spring rate is preferably selected, i.e., set by a spring rate adjustment mechanism (not shown) such that the amount of downward displacement D (113) is fairly close to the height H (105) of the regular panels 108. The amount of potential energy PE stored in the spring elements 110 is readily shown to be $$PE = \tfrac{1}{2} k D^2 \tag{1}$$

where k is the effective spring rate of the spring elements 110, assuming that the spring elements 110 are not preloaded. If the spring elements 110 are pre-loaded a distance $D_0$, then the potential energy stored in the spring elements 110 is readily shown to be $$PE = \tfrac{1}{2} k (D+D_0)^2 - \tfrac{1}{2} k D_0^2 \tag{2}$$

In general, the spring elements 110 are desired to be preloaded in order to reduce the amount of displacement D for a desired level of potential energy PE.

The source of potential energy PE that is stored in the spring elements 110 is the kinetic energy of the vehicle. Therefore, the kinetic energy of the vehicle is reduced by the amount of potential energy PE that is stored in the RAR panel 102 (108). Obviously, the panel 102 (108) and thereby the spring elements 110 have to be locked in their displaced position shown in FIG. 3. Otherwise, as the tire 112 passes over the panel 102 (108), the panel 102 (108) could transfer most of the stored potential energy back to the tire, thereby causing the RAR system to have a minimal effect in absorbing the kinetic energy of the vehicle, i.e., from slowing the vehicle down. Here, the locking action is intended to be provided by the brake 111, which is actuated by the braking force 115.

The preferred length of each of the RAR panels 102 (108) relative to the size of the tire 112 and the preferred methods of connecting the panels 102 (108) together and to the runway foundation 107 will be described later.

The components shown in the support and control elements 106 and 109 are the minimum type of elements that allow for the proper operation of the RAR 100. Additional elements, such as those previously mentioned may, however, be added to provide for features that may be desirable depending on the operational requirements of each runway, the level of automation that is desired to be incorporated into the overall design, for allowing for the adjustment of one or more of the parameters of the system, its effective height H (105), the configuration of the system, etc. In the remainder of this description, various preferred design configurations and the types and ranges of parameters are provided as a function of various desired operating conditions.

The operation of such reusable and adaptive runways (RAR) 100 is equivalent to the vehicle traveling along an inclined surface, thereby transforming its kinetic energy into potential energy proportional to the vertical height that its center of mass attains. In the present invention, the kinetic energy of the vehicle is transformed into potential energy stored in the deforming elastic elements, i.e., the springs 110. In certain situations, it may be desired to provide friction (braking action) and/or viscous damping elements that are positioned in parallel or in certain cases in series with the elastic elements, thereby dissipating a certain portion of the kinetic energy of the vehicle. Yet in other certain situations, it may be desired to use kinetic energy storage elements such as flywheels in series or in parallel with the elastic elements or even in place of the elastic elements. In a similar design, opposing magnet or magnets and coils (i.e., linear or rotary motors) may be used in parallel or in series with one or more of the aforementioned elements. Yet in certain other situations, electrical energy generators may be positioned in series or parallel with the elastic elements or in place of the elastic elements, or in series or parallel with the kinetic energy storage elements or in place of the kinetic energy storage elements. The electric energy generators or electric actuation devices (or in fact any other means of actuation) may be used as means to absorb part or the entire kinetic energy that is transferred to the RAR panels, or they may be used in part or entirely as means of controlling the rate of such energy transfers. The latter means of control is usually aimed at achieving a smooth motion for the vehicle. In general, the spring rates, viscous damping rates, and the characteristics of any one of the aforementioned elements may be constant or adjustable. Such means of adjustment of the characteristics and parameters of the aforementioned elements may be used to adjust the characteristics of the RAR 100 to their near optimal conditions for each approaching vehicle, its speed, and operating condition. The aforementioned elements may also have linear or nonlinear characteristics. The advantages and disadvantages of a number of aforementioned combinations and the general characteristics that they can provide the RAR system is described later in this disclosure.

In short, a number of combinations and configurations of one or more elastic elements, one or more kinetic energy storage elements, one or more viscous damping elements, one or more braking elements, one or more electrical or hydraulic or pneumatic motors or their combination, and one or more electrical energy generators may be positioned in series or in parallel to provide the desired effect of "absorbing" the kinetic energy of the vehicle.

The RAR panels 102 and 108 are preferably constructed with relatively rigid but lightweight materials as relatively rogod but lightweight structures. The surface of the panels are preferably coated with appropriately formulated material to enhance endurance, increase friction and decrease wear.

Figure 4:
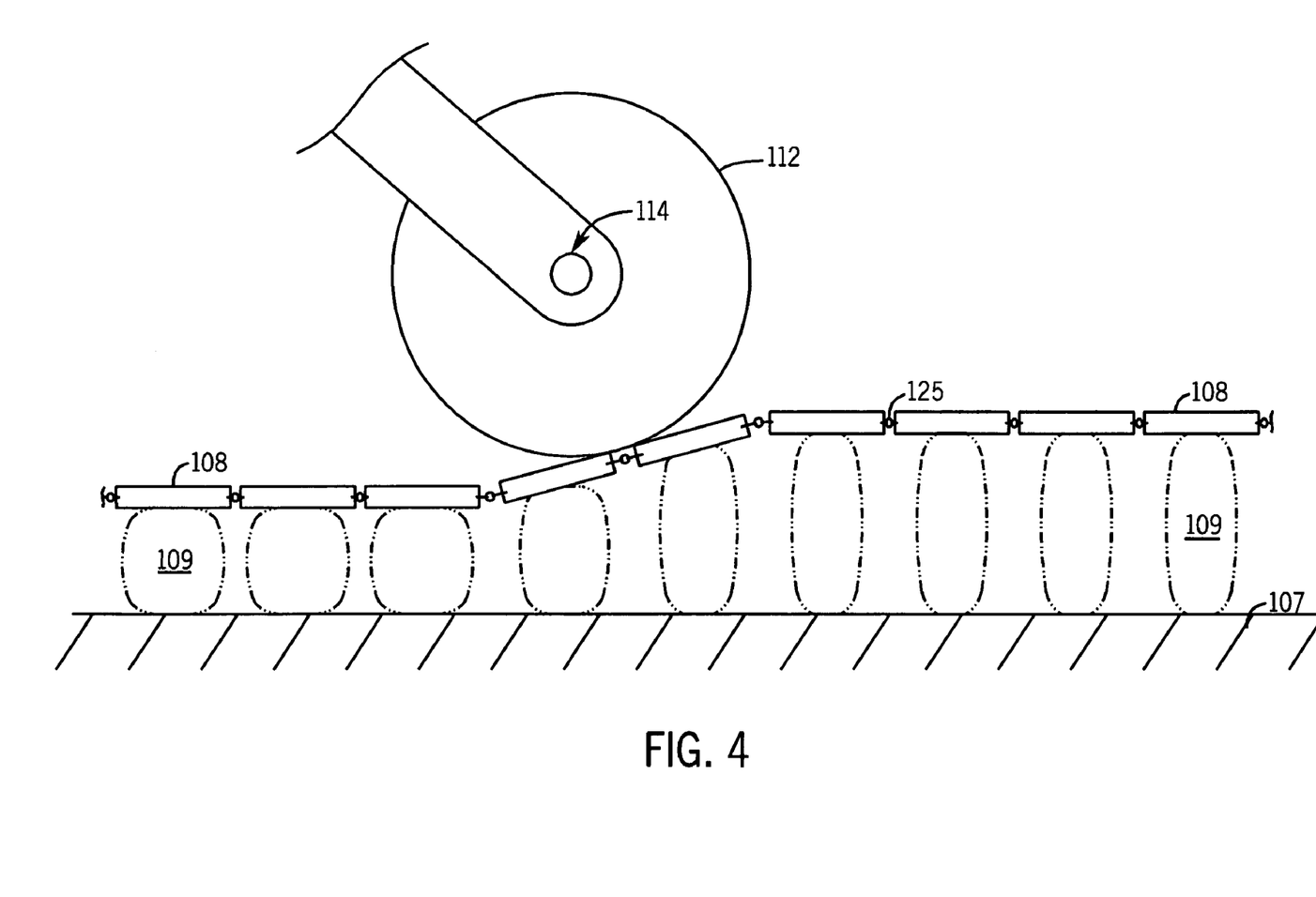
FIG. 4 illustrates a schematic cross section of another preferred implementation of the reusable and adaptive runway of the present invention.

The RAR surface panels 102 (108) may be constructed with panel or panel like elements that are relatively free to move relative to each other, particularly in the vertical direction and in rotation about a transversely directed axis (perpendicular to the vertical and longitudinal axes of the runway or roadway). In such a configuration, the horizontal motion of the panels 108 relative to each other and relative to the runway foundation 107 is preferably controlled by relatively stiff elastic elements 125 (FIG. 4), preferably with a considerable amount of (preferably viscous like) damping (such as with synthetic rubber type of materials) in order to control the panels from slipping in the longitudinal direction under the rotating tire. Mechanical stops may also be provided to assist in the control of the horizontal motion of the RAR panels 108. Such a RAR panel configuration is suitable when the size of the panels 108, particularly their length (measured along the length of the runway) is relatively small compared to the size of the vehicle tire such that at any point in time, the tire is in contact with more than one panel 108, preferably with at least three panels 108. The latter condition is necessary in order to assure a smooth motion for the vehicle as the tire moves from one panel 108 to the other, causing the panels 108 to generally conform to the shape of the tire as shown in FIG. 4, rather than causing the tire to move up a step like path.

Figure 5:
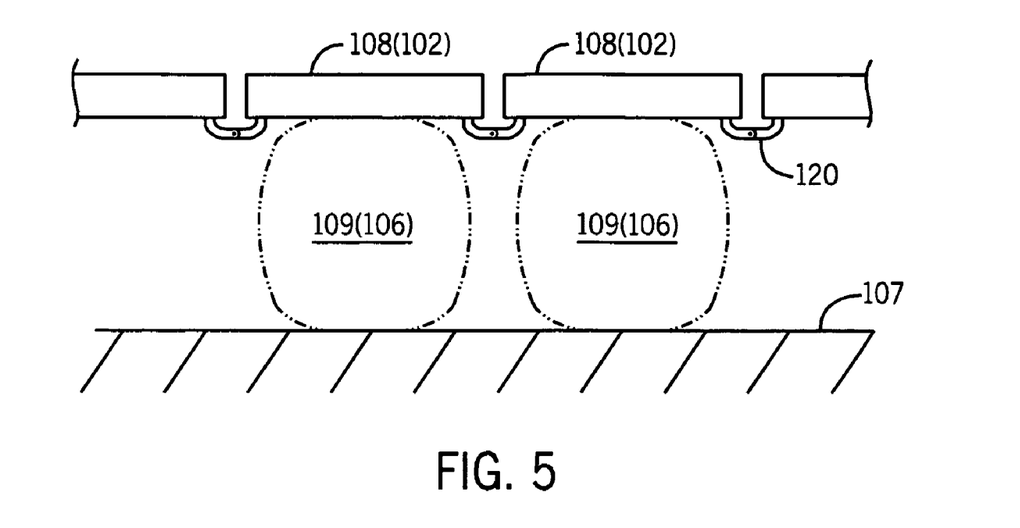
FIG. 5 illustrates a schematic cross section of yet another preferred implementation of the reusable and adaptive runway of the present invention.

In another embodiment of this invention, the surface panels 102 (108) are hinged together as shown in FIG. 5 along the length of the runway to allow for their relative rotation about their transverse axes in order to accommodate to the shape of the traveling tire 112. The panels 108 (or 102) are connected with hinges 120 to allow their relative rotation. Such a rotation is required for the smooth operation of the RAR so that as the tire moves over the first panel 108 (FIG. 5) and depresses a certain amount, the next panel 108 is rotated counterclockwise the required amount to allow such vertical displacement of the first panel 108 without resulting in a step to be formed between the two panels 108. The hinge 120 or at its connections to the panels 108 or the panels 108 themselves may be constructed with certain amount of flexibility to allow the change in the horizontal projection of the longitudinal length of the panels due to the relative rotation of the panels 108 to be compensated.

Figure 6:
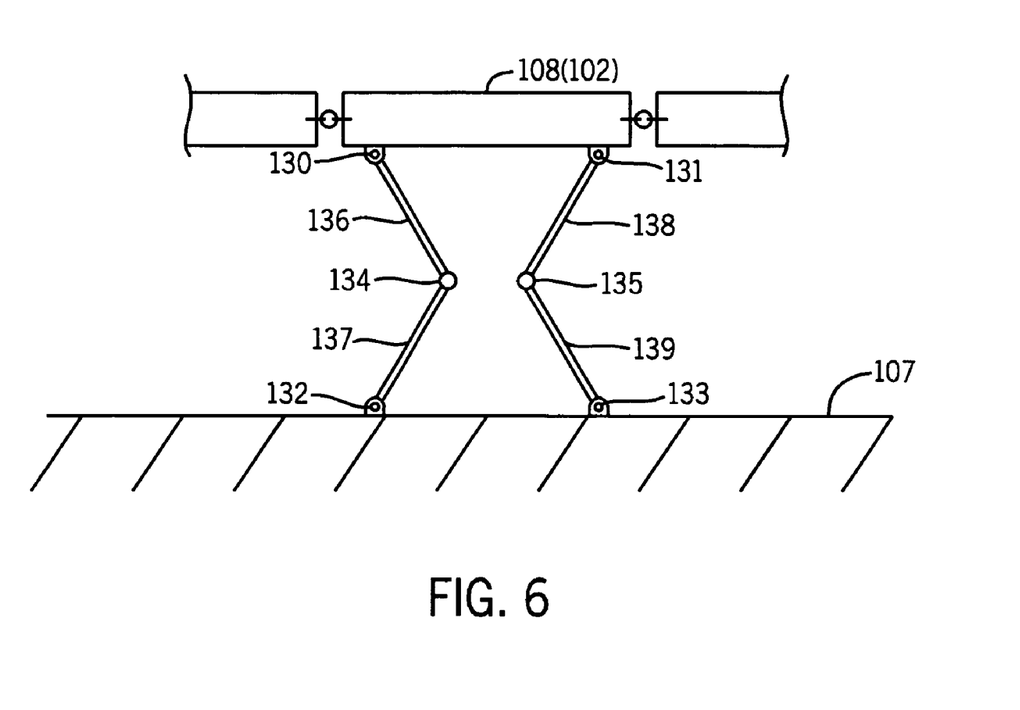
FIG. 6 illustrates a schematic cross section of still another preferred implementation of the reusable and adaptive runway of the present invention.

In yet another embodiment of the present invention, the panels are attached to the underlying structure (foundation 107) of the runway by means of mechanical elements, i.e., linkage or other types of mechanisms, such that their motion relative to the foundation is constrained in certain manner to allow for the smooth travel of the tire over the panels. An example of one of numerous possible types of such motion constraint mechanisms is shown in FIG. 6. This mechanism is constructed with linkage type of mechanisms. In FIG. 6, the side view of only one runway panel 108 (102) is shown. In this design, one side of the panel 108 (102) is attached with two links 136 and 137 which are hinged together at the hinge 134. The link 136 is attached to the runway panel 108 (102) by the hinge 130. The link 137 is attached to the runway foundation 107 by the hinge 132. The opposite end of the panel 108 (102) is attached to the foundation 107 by links 138 and 139 which are hinged together with hinge 135. In turn, the link 138 is attached to the panel 108 (102) by hinge 131 and link 139 is attached to the foundation 107 by hinge 133. The pair of links 136 and 137 and the pair of links 138 and 139 reduce the total degree of freedom of the panel for motion in the vertical plane from three degrees of freedom (two displacements and one rotation) to two degrees of freedom, i.e., the motion of the panel in the vertical plane is constrained by the linkage mechanism shown in FIG. 6 to two degrees of freedom. As a result, other elements of the mechanism 106 (109) (not shown in FIG. 6 for clarity), mostly the spring elements 110, provide fewer constraining forces to provide for the aforementioned desired motion of the panels as the tire travels over the panel. Those skilled in the art will appreciate that the elastic elements are operatively connected with the panels (or belt) to convert the kinetic energy of the vehicle to potential energy. Thus, the elastic elements can be directly connected to the panels (or belt) or connected to the links in way which deforms the elastic element(s) upon movement of the links.

Figure 12:
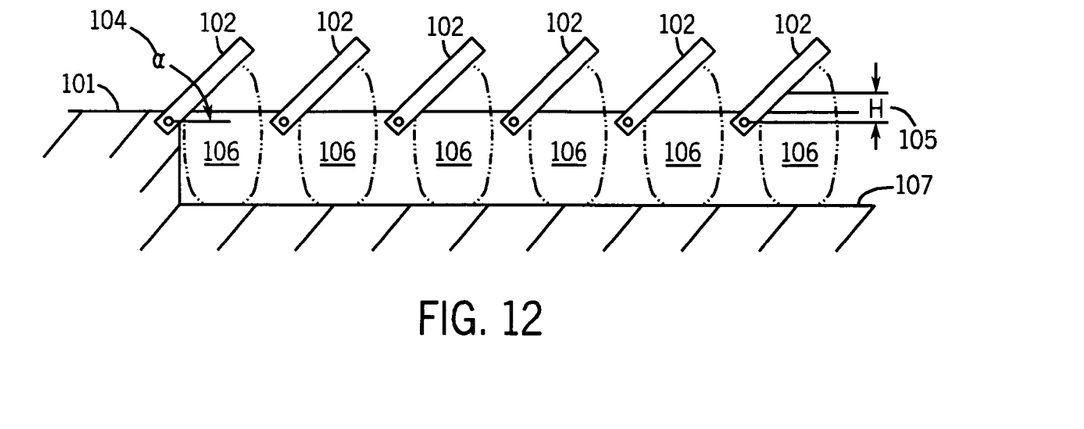
FIG. 12 illustrates a schematic cross section of still yet another preferred implementation of the reusable and adaptive runway of the present invention.

It should be noted that in general, the panels 108 (102) are desired to possess two degrees of freedom in motion in the vertical plane. This is the case since as the tire travels over the panels 108 (except a panel 102 located immediately following the fixed segment of the runway), the panels 108 are desired to undergo a motion which is essentially a counterclockwise rotation that brings their edge closest to the tire downward, followed by a clockwise rotation that brings the opposite edge of the panel downward until the panel is essentially horizontal. It is readily observed that if the panels 108 are short relative to the size of the tire 112 as shown in FIG. 4, then during the above counterclockwise and clockwise rotations, the panels 108 would also undergo a vertical displacement such that the panels are essentially tangent to the periphery of the tire 112 at all times. However, panels 108 that are long relative to the size of the tire 112 such that the tire 112 may be located at times entirely over the surface of only one panel 108, would undergo a more or less pure counterclockwise rotation as the leading edge of the panel 108 closest to the tire 112 is pushed downward to essentially the maximum set depth 105, and as the tire 112 moves over the panel 108, the panel 108 would then begin to rotate clockwise about the same leading edge until the panel 108 is essentially horizontal. The configuration of the panels 102(108) is shown by way of example only and not to limit the scope or spirit of the present invention. For example, as shown in FIG. 12, all or a significant portion of the panels can be arranged at an angle α such as the transition panel 102, or alternatively, all of the panels could be arranged flat (e.g., α=0), such as panels 108. In the alternative configuration of FIG. 12, the panels 102 are not attached to each other but are instead all hinged to the roadway for pivotal movement therewith.

Figure 7:
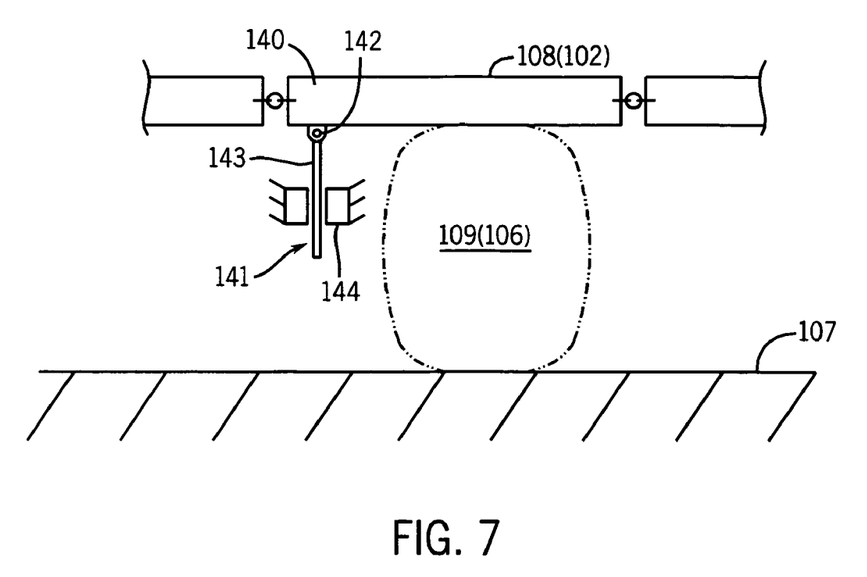
FIG. 7 illustrates a schematic cross section of another implementation of the reusable and adaptive runway of the present invention.

Another class of mechanism that may be used to constrain the motion of the aforementioned longer runway panels 108 (102) relative to the runway foundation 107 to the aforementioned sequential counterclockwise and clockwise rotation about the leading edge 140 closest to the incoming tire 112, as shown in FIG. 7. In this class of constraining mechanisms, the motion of the leading edge 140 of the panel 108 is constrained to a vertical motion, while the panel 108 (102) is free to rotate about the leading edge 140. In the mechanism shown in FIG. 7, the motion of the edge 140 is constrained to the vertical direction by the sliding joint 141, which consists of the sliding element 143 and the guide 144. The sliding element 143 is hinged to the edge 140 of the panel 108 (102) by a rotary joint 142, thereby allowing the panel to rotate counterclockwise as the edge 140 is pushed down to the previous panel and once the tire 112 begins to move over the panel 108 (102) shown in FIG. 7, to allow the panel 108 to rotate in the clockwise direction until it is essentially horizontal and depressed a distance H 105. A plurality of such motion constraint mechanisms may be constructed. In fact, the mechanism shown in FIG. 7 is selected only for the purpose of demonstrating the mode of operation of such motion constraint mechanisms and does not constitute the preferred embodiment unless the sliding joint is constructed as a living joint. This is the case since sliding joints constructed sliding and guiding elements, even together with balls or rollers or other anti-friction constructions, are much more susceptible to sticking, generally generate more friction forces, are harder to keep free of dirt and contaminants, and are generally larger and heavier, thereby are generally desirable to be avoided. The preferred mechanisms are constructed with rotary joints, such as in the form of one of many well-known linkage mechanisms that generate nearly straight-line motions.

Figure 8:
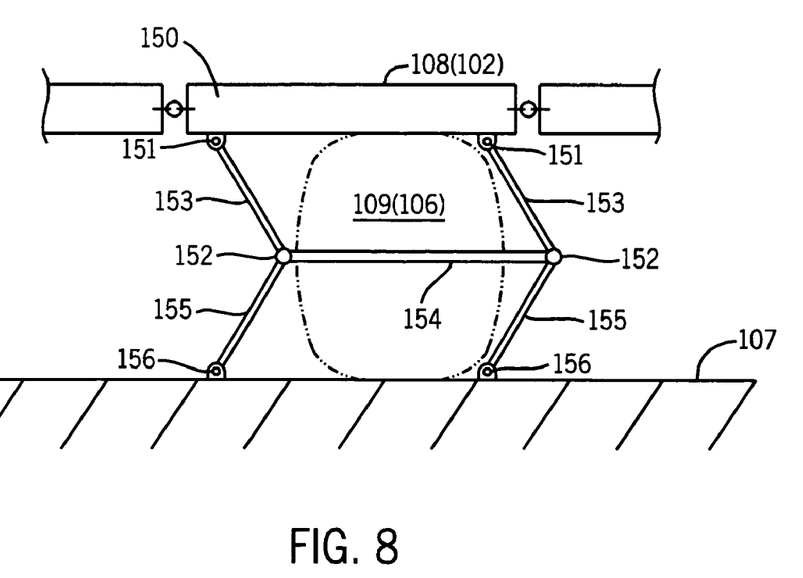
FIG. 8 illustrates a schematic cross section of still another preferred implementation of the reusable and adaptive runway of the present invention.

Motion constraining mechanisms may also be preferably used to constrain the motion of the panels 108 (102) to rotations about axes perpendicular to the longitudinal and vertical directions, i.e., clockwise and counterclockwise rotations as illustrated in FIGS. 4, 5, 6, and 7. In the schematic of FIG. 8, the edge 150 of a runway panel 108 (102) along the width of the runway 107, i.e., as viewed in a direction parallel to the longitudinal direction of the runway, is illustrated. To limit the motion of the runway panel to the above rotations, the motion constraining mechanism constrains the edge 150 to motions in the vertical direction while keeping the edge 150 parallel to the horizontal plane (here, for the sake of simplicity and without intending to place any limitation on the design of the runway foundation, the foundation surface is considered to be flat and parallel to the horizontal plane). The simplest linkage mechanism that would provide the above constraining motion, is a double parallelogram mechanism 160 as shown in FIG. 8. The mechanism consists of links 153 of equal lengths that are attached to the runway panel 108 (102) by spherical joints 151; links 155 of equal lengths that are connected to the foundation 107 with spherical joints 156; and a common link 154 to which the ends of the links 153 and 155 are hinged with rotary joints 152. One or more double parallelogram mechanisms 160 may be used to constrain the motion of each runway panel 108 (102).

Figure 10:
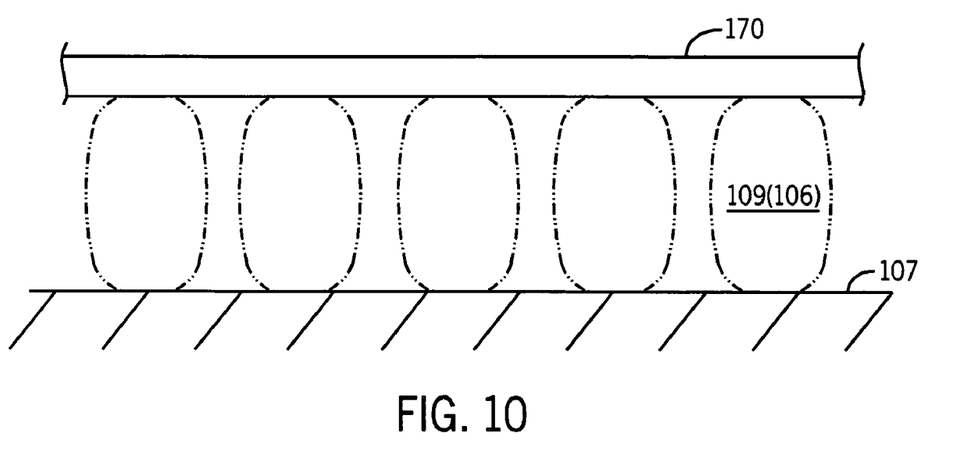
FIG. 10 illustrates a schematic cross section of still another preferred implementation of the reusable and adaptive runway of the present invention.

In yet another embodiment of the present invention as shown in FIG. 10, the panels are replaced with an appropriately sized and relatively flat surfaced chain like or belt like structures 170 that cover a commonly used underlying support structure which is in turn attached to the support and control elements 106 (109) with or without one or more of the aforementioned motion constraining mechanisms. The use of such chain or belt like surface structures allow for a smoother travel of the tire, similar to the case of shorter panels shown in FIG. 4. For example, a continuous belt segment would in effect act similar to panels with very small lengths.

Hereinafter, the above types of runway surface elements are referred to as runway panels without intending to limit them to any one of the above designs. To those skilled in the art, numerous other "runway panel" design configurations that allow relatively smooth vertical displacement of the underlying surface as the vehicle tire travels over such "runway panel" and thereby affect deformation of appropriately positioned elastic potential energy storage elements similar to the spring elements 110 are possible and are intended to be covered by the present disclosure.

The runway panels are elastically supported by spring elements that are positioned between the panels and the runway foundation. The elastic (spring) elements may take any form, for example, they may be constructed in a helical or similar form by spring wires of various cross-sections, or they may be formed as torsion or bending springs, torsion bars, or any of their combinations. To optimally control the vertical movement of the runway panels, the spring rates, i.e., the relationship between the applied vertical force and the resulting vertical displacement of the runway panel may be linear or nonlinear. The spring elements may be positioned directly between the runway panels and the runway foundation or act on the mechanical elements that provide motion constraint to the panels. In general, various spring types and configurations may be used to provide various elastic responses upon the application of load (mostly vertical) at certain points on the panel, i.e., to provide the desired effective spring rates in response to the vertical displacement and rotation about an axis directed in the transverse direction.

Figure 11:
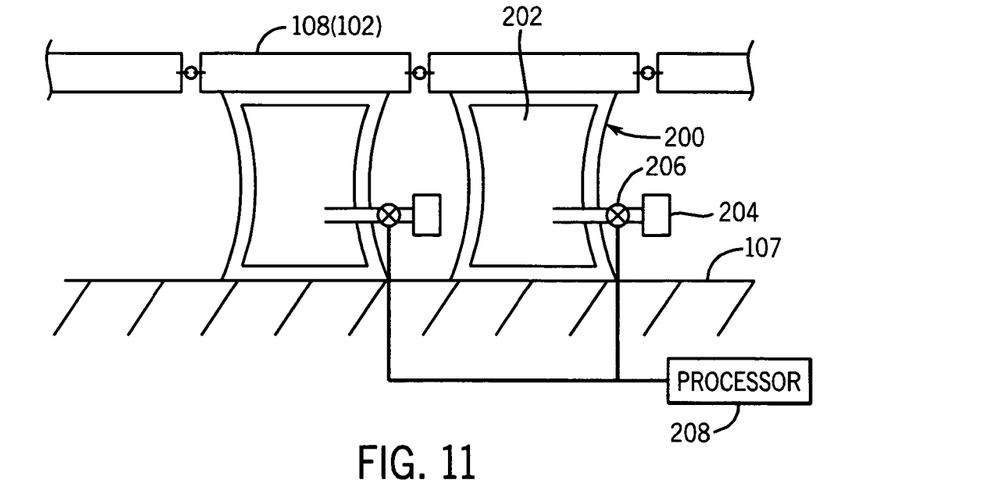
FIG. 11 illustrates a schematic cross section of still another preferred implementation of the reusable and adaptive runway of the present invention.

The potential energy storage elements can also be the structural elements disclosed in U.S. Pat. No. 6,054,197, the contents of which are incorporated herein by its reference. In general, as shown in FIG. 11, the weight 115 of the tire 112 deforms the structural element 200 which is disposed between each panel 102(108) and the runway base 107 to store a potential energy therein. The structural element may also itself serve as the braking element where displaced fluid 202 from the interior of the structural element (caused by the deformation) is captured in a reservoir 204 and restricted from returning to the cavity 202, such as by closing a valve 206 while the structural element is deformed. The structural element 200 is released or reset (extended) by removing the restriction, such as by opening the valve 206 to allow the fluid to flow back into the cavity 202. Preferably, the structural elements 200 are remotely controlled by a processor 208 operatively connected to a solenoid which operates the opening and closing of the valves 206. The amount of deformation the structural elements undergo can also be controlled and varied by the processor by controlling the amount that the valves 206 open (i.e., the orifice size is varied). A structural element 200 corresponding to a valve 206 that is partially opened will be more rigid and thus undergo less deformation than a structural element having a corresponding valve 206 that is fully open.

Each runway panel assembly, i.e., the runway panel, its motion constraining mechanisms and the elastic elements, viscous and dry friction based damping elements, are also equipped with one-way locks, that as the elastic elements are deformed under load, they are held in their maximum deformed position and are substantially prevented from regaining their original configuration as the load is lifted. Such one-way locking mechanisms may be placed at any appropriate position between the runway panels and the foundation or between the runway panels and the mechanical motion constraining elements. The one-way locking mechanisms may also be positioned in parallel with one or more of the elastic elements, or may be constructed as an integral part of one or more of the elastic or damping elements. Regardless of their design and the method of integrating them into the runway panel assembly, the one-way locks serve one basic function. This basic function is to "lock" the depressed runway panels in place and prevent them from "springing" back to their original position. In other words, as the airplane or other vehicle tire displaces a runway panel, the work done by the force exerted on the displacing surface panels (mostly vertically and some in rotation) is to be stored in the spring elements 110 (200) as potential energy. The function of the aforementioned one-way lock mechanisms is to "lock in" this potential energy by preventing the spring elements 110 (200) from moving back to their original position. The potential energy stored in the spring elements 110 (200), neglecting all other commonly present energy losses due to friction, etc., is equal to the kinetic energy that is transferred from the airplane or other vehicle to the spring elements 110 (200). In general, one or more elastic elements of various types may be used on each runway panel and one or more of the spring elements may be initially preloaded. The primary purpose of preloading of the elastic elements is to reduce the amount of vertical and/or rotational displacement of the runway panels for a given applied load. Another function of selectively preloading one or more of the elastic elements is to create the load-displacement (rotation) characteristics that is optimal or close to optimal for the operation of the runway.

In the preferred embodiment of this invention, the effective spring rates of each runway panel assembly and the spring preloading are adjustable remotely. The spring rates and preloads may obviously be adjustable manually, particularly for runways that are only used with a few similar types of airplanes.

In general, the runway panel assemblies are designed such that they do not require motion damping elements such as viscous dampers for their proper operation such as to prevent the bouncing action upon initial tire contact. Such dampers are used to control the response of the runway panel assemblies to the speed of application of the tire load. In any case, minimal damping is desired to be used to make the RAR most responsive to high-speed vehicles. In addition, if the stored potential energy in the elastic elements are intended to be used or harvested, minimal damping is desired to be employed since such dampers would convert a portion of the kinetic energy of the plane into heat, i.e., a type of energy that is difficult to harness as compared to potential energy stored in elastic elements.

On the other hand, certain runway panel assemblies, particularly those that are located at or close to the portion of the runway over which the plane travels at high speeds, may be desired to be equipped with motion damping elements such as viscous dampers that are appropriately positioned to provide resistance to the displacement and/or rotation of the runway panels for smooth operation. The effective damping rates of these elements are also desired to be adjustable remotely, manually and if possible by a closed-loop control loop.

When the runway is intended to slow down airplanes upon landing, the plane may first land on a regular (fixed) runway segment and then enter the RAR segment to be slowed or be brought to complete stop. In such cases, it is important that the transition between the two runway segments be as smooth as possible. Such smooth transitions are readily obtained, e.g., by providing higher spring rates for the initial highway panels and/or hinging them to the edge of the regular runway segment and then gradually decreasing the panel spring rates to achieve maximum deflection, i.e., maximum vertical displacement of the runway panels under tire load. As the result, the vehicle begins to slow down smoothly as it enters the RAR segment. Then, as the plane continues to travel along the RAR segment, the runway panels begin to be displaced vertically to their maximum set amount, and the kinetic energy of the plane continues to be transferred to the spring elements, while a certain (usually much smaller) portion of the kinetic energy is dissipated in the viscous damping and/or brake like friction elements. The plane will loose no control since the slowing down process does not involve any skidding or reduction or loss of contact friction between the tires and the runway surface. This is in total contrast with sand-filled roads and collapsible concrete runways that would form certain "pathways" along which the tires are forced to travel. Of course, the RAR may also constitute the entire runway which may be much smaller in length then a conventional runway for the same size aircraft.

Once the plane has been slowed down to the desired speed or has been brought to rest, the braking mechanisms of the runway panels can be released to slowly bring the panels to their original position. To make the movement smooth and prevent vibration, viscous damping or friction elements may be engaged during this return movement. Alternatively, energy transformation means such as electric generators may be used to transform the stored energy in the elastic elements into usable electric energy.

On the other hand, the potential energy stored in the elastic element of the runway panels may be used to accelerate a plane during its takeoff. The process is the reverse of the slowing down process. Here, as the tire moves over a depressed runway panel, the panel brakes are released in a controlled manner from the back of each panel to the front as the tire moves over the panel, thereby pushing the plane forward and transferring the potential energy stored in the elastic elements to the plane as kinetic energy. By properly releasing the braking mechanisms, it is possible to transfer most of the stored potential energy to the plane. This process has the effect of allowing the plane to travel along a runway with a downward incline, thereby transferring the potential energy of the plane due to the total drop in the plane elevation to the plane in the form of kinetic energy.

Both landing and taking off processes using RAR can be seen to be highly energy efficient. During the landing, minimal or no braking is required. During takeoff, a large portion of the required kinetic energy can be absorbed from the RAR. By appropriate selection of the RAR parameters, planes are able to land and take off in relatively short runways. Such runways can therefore be also very useful for the construction of emergency landing and takeoff strips and for aircraft carrier.

In general, elastomeric or hydraulic type of shock absorbers and bumpers may be used to limit the motion of the runway panels 108 (102) in the vertical direction to the designated depth H (105), or prevent excessive lateral motion of the panels or the motion constraint mechanisms, etc. In all situations, such elements are provided in order to smoothly bring these components to a stop and without a sudden shock. For the case of the depth 105 limiting stops, the allowable depth H (105) is preferably adjustable by a control system that adjusts the system parameters for each particular vehicle and initial speed and operating condition. Such a controller is described above with regard to FIG. 11, however, similar control methods may be employed in the other embodiments discussed herein for controlling any or all system parameters.

Figure 9:
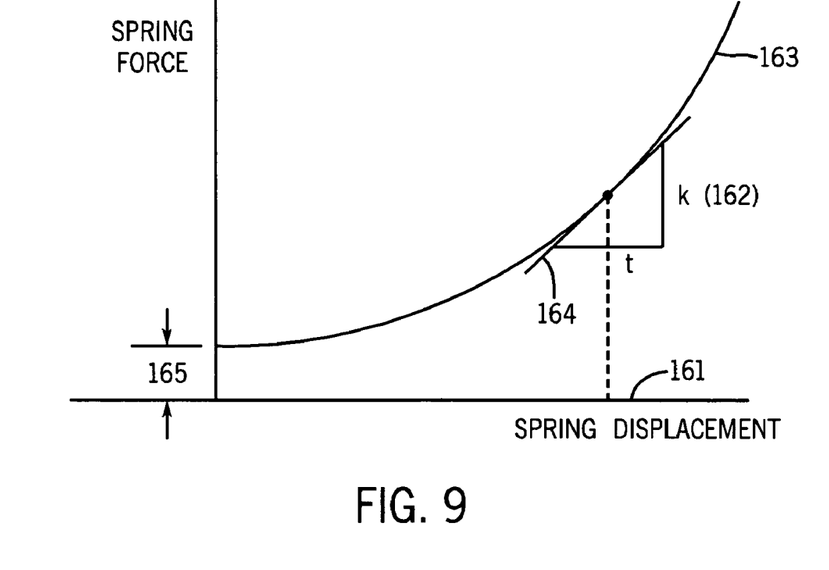
FIG. 9 illustrates a graph showing a preferred relationship between spring displacement and force for the spring elements of the reusable and adaptive runway of the present invention.

In general, the spring elements 110 are preferably preloaded to reduce the required depth H (105). It is also generally preferable to have springs with nonlinear force displacement characteristics of the general form shown in FIG. 9 so that as the deformation is increased, the effective spring rate is also increased. Such a spring rate characteristic allows the springs to also act as effective stops as the maximum desired depth H (105) is approached. The general shape of the desired spring displacement versus spring force curve 163 is shown in FIG. 9. The amount of preloading force is indicated by 165. The spring rate, i.e., the slope of the curve 163 increases with spring displacement. For a given displacement 161 of the spring, the corresponding spring rate k (162) is given by the slope of the tangent 164 at that point on the curve 163. As can be observed, by proper selection of the spring 110, as the displacement is increased (in this case as it reaches the desired amount H (105), the spring rate becomes very large (somewhere to the right of the point 161), where the spring turns into an effective stop.

In general, more than one wide runway panel 108 (102) is desired to cover the width of the runway. By utilizing narrower panels, the effective mass that is displaced as the tire moves over a panel is reduced, thereby allowing for the RAR panels to respond quickly. As a result, faster moving vehicles can be accommodated. In which case, the panels are desired to be hinged together as described for the longitudinal sides of the panels, together with similar elastic elements to allow the length variations due to the relative rotation of the panels. In one embodiment of the present invention, the aforementioned relative rotation of the panels along their hinged side edges is allowed. Such an option would provide a certain amount of barrier that the tires have to climb in order to move in the direction of the width of the runway. Such a barrier is desired, particularly if the vehicle is damaged or if the pilot is having problems controlling the vehicle. In an emergency situation, by allowing the depth H (105) to become larger, a larger stabilizing barrier can be provided for keeping the vehicle on the runway. For such emergency situations, auxiliary barriers positioned on the sides of the runway may also be activated to increase the height of the side barriers. On the other hand, in normal situations, the aforementioned relative rotation of the panels is preferably limited or is totally prevented by the provided hinges and the motion constraining mechanisms.

Although the RAR is described above having static parameters, such parameters can be variable, either adjusted manually or automatically in response to sensed characteristics. For Example, the RAR can be equipped with sensors for detection of the position, size, and/or velocity of the vehicle before entering the RAR. The information detected by one or more sensors is then input to a processor, which adjusts the parameters of the RAR before the vehicle enters the RAR. The sensors can also continue to monitor the vehicle as it travels on the RAR and adjust the parameters thereof accordingly. For example, one parameter that can be adjusted based on the sensed characteristics is the spring rates of the spring elements 110. Means for adjusting spring rates of spring elements are well known in the art, such as helical or other passive springs in combination with pressurized gas springs. Another example of a parameter that can be adjusted, is the viscous damping rates of the damper can also be adjusted based on the sensed characteristics. Means for adjusting damping rates are well known in the art, such as providing an electrically actuated orifice change or by using magneto-restrictive fluids in fixed orifice fluid dampers. Yet another example of a parameter that could be adjusted in response to the sensed characteristics is to provide moving stops that vary the amount of movement of the panels 102, 108. The stops can be moved by any means known in the art, such as by using electrically or hydraulically driven lead screws. These characteristics can be varied as a whole (applied to all of the panels 102, 108, or applied to selective panels 102 (108) and done manually or under the control of a central processor or control unit.

Figure 13:
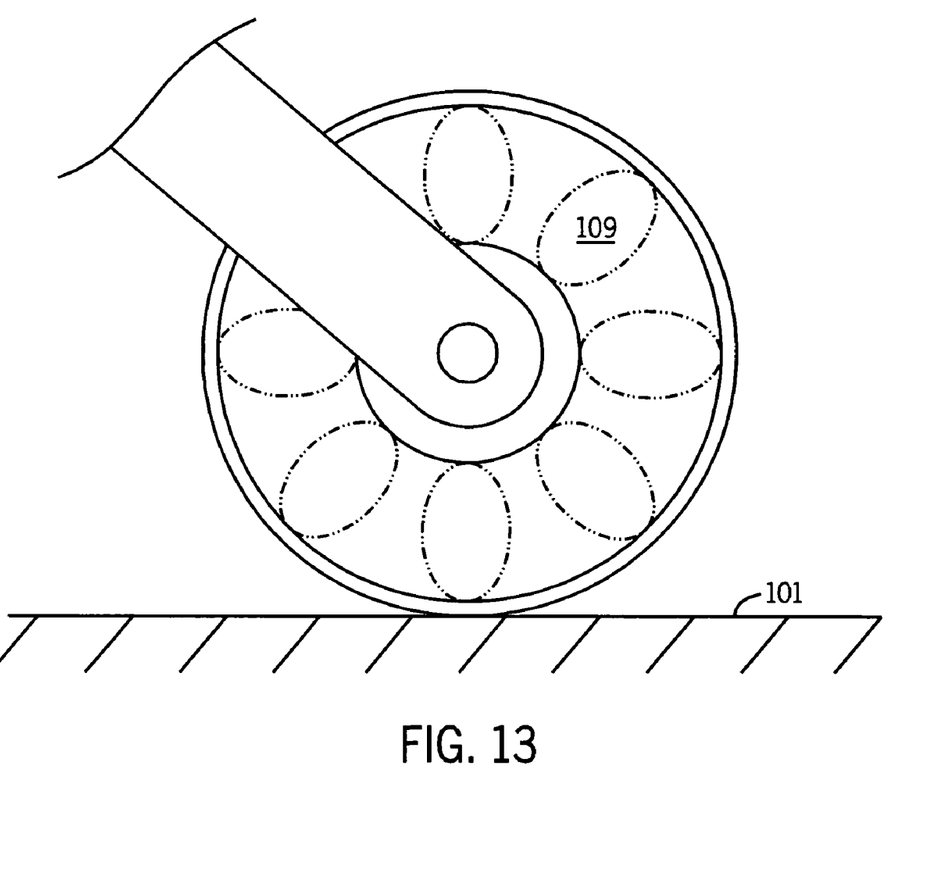
FIG. 13 illustrates a sectional view of a vehicle tire having means for converting kinetic energy of the vehicle to potential energy, similar to that of the RAR.

Referring now to FIG. 13, there is shown a tire 300 capable of transferring the kinetic energy of a vehicle to potential energy thus slowing the vehicle as if it were going up an inclined surface. The tire 300 has support and control assemblies 109 similar to that described above with regard to the RAR. Those skilled in the art will appreciate that as the tire 300 rotates, the elastic elements contained in the support and control assemblies 109 are deformed and held in the deformed state (such as with a braking element) similar to that described above with regard to the RAR. As the tire 300 further rotates such that the deformed elastic elements are no longer in contact with the roadway (or runway) 101, the braking of the deformed elastic elements is released and the process repeats as the tire continues to roll over the roadway 101. Those skilled in the art will appreciate that such a tire, when activated, slows the vehicle as if the vehicle was traveling up an inclined surface. Those skilled in the art will further appreciate that the tire can also be used to accelerate the vehicle. When the tire 300 is used during normal operation the elastic elements are either not engaged so as not to deform or permitted to freely deform without being held in the deformed state.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for accelerating a passengered vehicle upon a roadway, the method comprising:
   providing a plurality of movable panels on the roadway upon which the passengered vehicle travels, the plurality of movable panels being arranged in a direction of travel of the passengered vehicle;
   fixing the plurality of movable panels in a depressed state to store potential energy associated with the plurality of movable panels;
   releasing one of the plurality of movable panels from the fixed state as a tire of the passengered vehicle moves over the one of the plurality of panels to transfer the stored potential energy to the tire to thereby propel the vehicle; and
   repeating the releasing for one or more subsequent panels of the plurality of panels in the direction of travel in a controlled manner as the tire passes over the one or more subsequent panels to continue propelling the vehicle.

* * * * *